Figure 1:
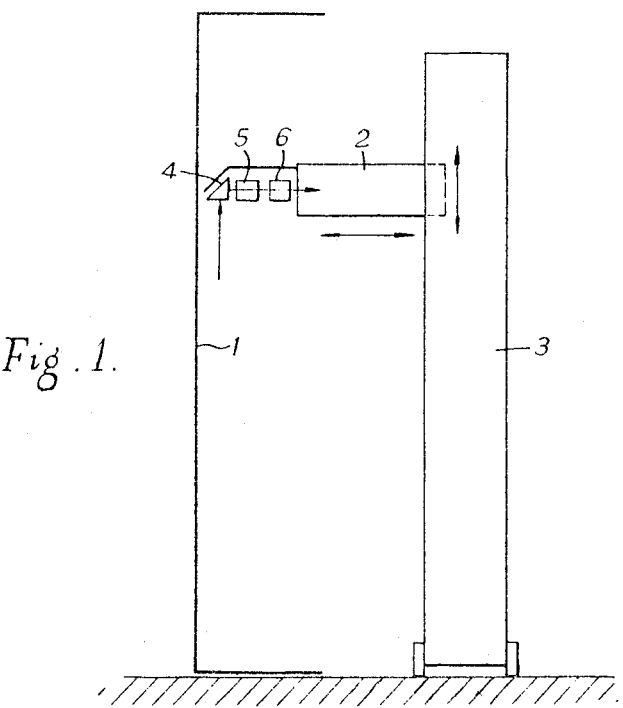

Sept. 6, 1966

H. H. HOPKINS 3,270,616

THREE COMPONENT LENS SYSTEM HAVING EXTERNAL
ENTRANCE AND EXIT PUPILS

Filed Oct. 4, 1962

2 Sheets-Sheet 1

3,270,616
THREE COMPONENT LENS SYSTEM HAVING EXTERNAL ENTRANCE AND EXIT PUPILS

Harold Horace Hopkins, Barnet, England, assignor to Communications Patents Limited, London, England
Filed Oct. 4, 1962, Ser. No. 228,370
Claims priority, application Great Britain, Oct. 12, 1961, 36,612/61
3 Claims. (Cl. 88—57)

This invention relates to optical lens systems, and more particularly to intermediate relay lens systems in which both the entrance pupil and the exit pupil are external to the system. A lens system according to the present invention is of use when a relatively wide angular field is required together with a wide aperture, and also when the equivalent focal length of the system must be short.

A particular application of such a lens system is for viewing selected areas of a landscape model as used in and aircraft flight simulator for training pilots in visual landings.

Because of the high landing speed of modern aircraft and the great length of landing run consequently required, it is necessary for a correspondingly large area to be represented by the landscape model. Space requirements necessitate the use of a small scale for such a presentation, say of the order of 1 inch on the model representing 100 feet. With such a scale, the input lens of an optical viewing lens system must be capable of viewing the surface of the model, in a direction substantially parallel to the surface thereof, from a viewpoint down to about one tenth of an inch above the model surface. The optical lens system therefore has to meet a very difficult specification.

With the highest intensity of lighting of the model which is possible in practice, the lens system must still have a wide aperture. In order to present the trainee pilot with a forward view of reasonably wide angle, the lens system must have a wide angular field. Further, it is most desirable that the optical axis of the lens system shall be directed substantially parallel to the surface of the landscape model to simulate a pilot's actual view when an aircraft is approaching a landing strip with a normal landing stance. When this is done, the lens system views an area of the model which lies completely on the model side of the optical axis. To obtain an undistorted presentation of the part of the model viewed, it is necessary for the lens system to provide an image in a plane inclined to the optical axis of the system. This image is then reproduced at the screen of a television camera by a second optical lens system acting as a copying lens.

The present invention provides a novel optical intermediate relay lens system adapted to serve as the first of these two optical systems.

In intermediate relay lens systems, when an object is imaged by one optical lens component and that image is re-imaged by a second optical lens component, it is customary to employ a field lens at the intermediate image position.

The function of this field lens is to image the aperture of the first lens component at the aperture of the second lens component. This arrangement ensures that pencils of light emerging from the first lens component pass centrally through the second lens component. Although such an arrangement is accepted practice, it carries with it a serious disadvantage, in that the power of the field lens, which power is defined as the reciprocal of the focal length of the lens, is positive and large. This characteristic of the field lens adds to the positive power of the first image-forming lens component and results in a very large curvature of the image. To a first approximation, the radius of curvature of the image surface is given by the reciprocal of the so-called Petzval sum "P" of the system. If $F_1$ and $F_f$ are the focal lengths of the second, or copying lens, component and of the field lens respectively, the value of P is given by:

$$P = \frac{1}{F_1} + \frac{1}{F_f}$$

if the lenses are considered to be thin lenses. The value of P is usually even greater for thick lenses. If $F_1 = 0.44$ cm., the value of $F_f$ will in most cases need to be even smaller than 0.44 cm. Consequently, P will be greater than 0.22 cm.$^{-1}$, which leads to an unacceptably large curvature of the image.

By using compound systems for these lens components, the Petzval sum can in theory be reduced, but it is not practicable to do this for the first lens component when the entrance pupil is at some appreciable distance, of the same order as $F_1$, outside the system. In such cases, the diameter of the lens must be greater than its focal length, for example about 1½ times greater for a 52° field and for a relative aperture of F/1.8. It is known that the correction of aberrations of such a system would present an impossible task in practice.

Similarly, with a field angle of 52°, the field lens would need to have a diameter at least as large as its equivalent focal length, and this would lead to an impracticable system.

A further consideration is that the overall axial thicknesses, of such lenses would be very large, thus making it difficult, or even impossible, for the lenses to be sufficiently close together. For example, if the diameter of a single lens, such as a field lens, is equal to ⅔ of the equivalent focal length, a complete sphere is required for the lens, because each lens surface has a radius of ⅔ the equivalent focal length, a refractive index of 1.50 being assumed.

An object of the present invention is to provide an improved optical lens system, having both the entrance pupil and the exit pupil external to the system, having a comparatively wide angular field, a comparatively large aperture and a comparatively short equivalent focal length. A lens system according to the invention departs radically from conventional lens systems in that the image forming system and the associated field lens of the conventional lens system are replaced by a single compound system of spaced optical elements designed as a single entity.

The invention comprises an optical lens system in which both the entrance pupil and the exit pupil are external to the system, comprising first, second and third lens components, each of which may be formed by a simple lens or by compound lenses, the three components being arranged in sequence along the optical path through the lens system from object viewed to image plane, the first lens component having a positive equivalent focal length, the second lens component having a positive equivalent focal length, the third lens component having a negative equivalent focal length, and the lens system as a whole having an equivalent focal length which is positive and numerically smaller than the equivalent focal lengths of each of the three lens components individually.

Preferably, the sum of the reciprocals of the equivalent focal lengths of the three lens components is zero, or numerically very small in relation to the reciprocal of the equivalent focal length of the complete lens system.

Preferably, the equivalent focal length of the first lens component is numerically greater than that of the second lens component which, in turn, is numerically greater than that of the third lens component.

Preferably, also, the separation between the principal planes of the second and third lens components is greater than the separation between the principal planes of the first and second lens components. The ratio of these two separations preferably exceeds 3:1.

Preferably, also, the lens components and their spacings are such that a real image is formed between the second and third lens components, and such that the distance of this real image from the principal plane of the second lens component is less than its distance from the principal plane of the third lens component.

A particular embodiment of the invention is a system for providing a remote visual representation of a part of the surface of a landscape model, from a viewpoint corresponding to that of a pilot in an aircraft flying over the landscape represented by the model, comprising a television camera having a viewing lens system as described above and an associated television receiver.

Figure 2:
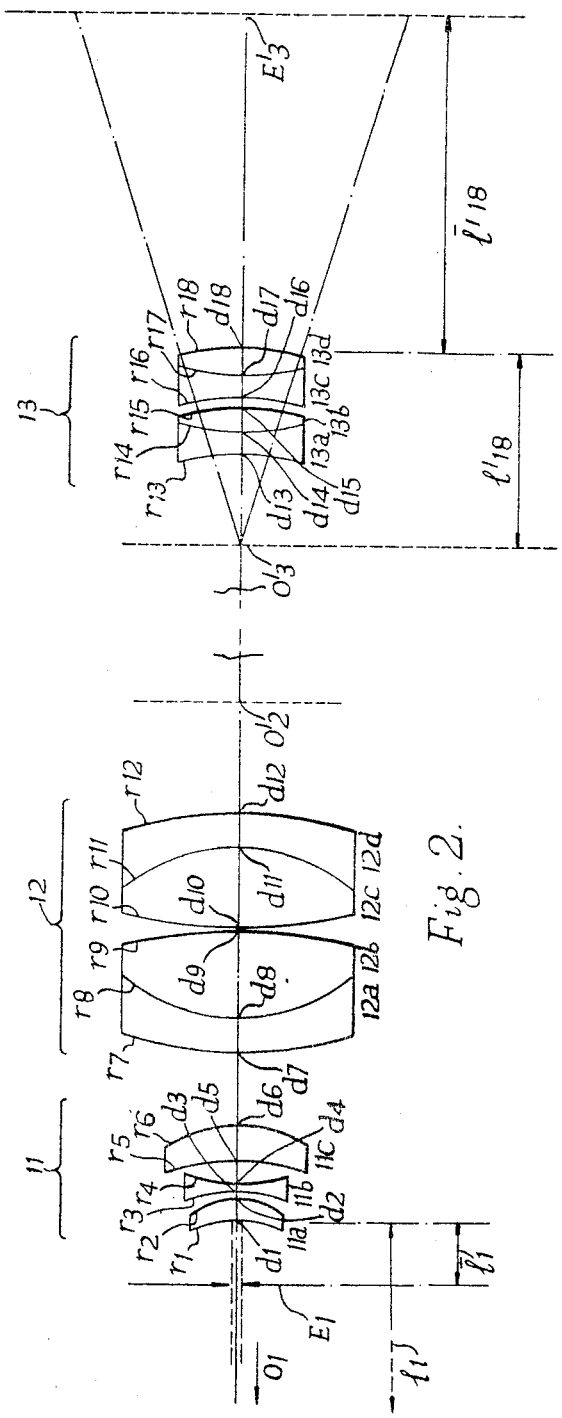

In order that the invention may readily be carried into effect, one embodiment will now be described, by way of example, with reference to the accompanying drawings, in which:

FIG. 1 is a diagrammatic representation of a landscape model and of a television camera arranged to view the model from the viewpoint of an aircraft pilot coming into land upon an aircraft runway included in the model, and FIG. 2 is a diagrammatic representation of the lens components in a lens system associated with the camera of FIG. 1.

In the arrangement of FIG. 1 a landscape model is arranged with its surface 1, which represents the horizontal ground surface, arranged vertically in order to facilitate the mounting of a color television camera 2. The television camera 2 is mounted at one side of the model on a wheeled carriage 3 for movement in a direction lengthwise of and parallel to the surface 1. The carriage 3 also provides vertical and horizontal movements of the camera 2 normal to the surface 1. These two movements correspond respectively to transverse horizontal movement and to vertical movements of the aircraft.

As indicated in FIG. 1, the complete optical system at the camera includes a prism 4 which acts as a mirror and permits the optical axis of the optical intermediate relay system 5 to extend normally away from the surface 1 towards a copying lens system 6. By means of this optical system and the camera movements provided, the surface 1 can be viewed by the camera 2 from a viewpoint corresponding to that of the pilot of an aircraft flying over the surface 1, along any desired course, at any desired speed and at any desired height, down to a minimum height determined by the size of the prism 4.

Referring now to FIG. 2, the optical intermediate relay system 5 shown therein includes three lens components, a first lens component 11, a second lens component 12 and a third lens component 13, arranged in that order along the optical path through the lens system from the object to be viewed to an image plane.

Lens component 11 consists of three lenses 11a, 11b, 11c. Lens component 12 consists of four lenses 12a, 12b, 12c, 12d, and lens component 13 consists of four lenses 13a, 13b, 13c, and 13d. In FIG. 2, the numerals r1 to r18 indicate the curved surfaces of these lenses, the numerals d1 to d18 denote various points along the optical axis, for the most part representing the points where the optical axis of the system intersects the various lens surfaces.

The following Table A sets out the relevant details of the lenses forming the lens system. In the table:

r1, r2, r3, et cetera, denote the radii of the curved surfaces to which those numerals relate;
the signs + and − are used respectively to denote that the surface is concave towards the right of FIG. 2 or convex to the right of FIG. 2;
d1–2, d2–3, et cetera, denote the distances between the points to which numerals d1, d2 and d3 refer;

nd refers to the refractive index for the material of the lens for the helium "d" line;
V denotes the dispersion of the part of the optical path indicated, and is equal to: $nd - 1/nF - nC$, where $nF$=refractive index for the wavelength of Fraunhofer F line and $nC$=refractive index for the wavelength of Fraunhofer C line;
D denotes the diameter of the aperture of the lens in centimeters.

Other important measurements in the optical system shown in FIG. 2 are as follows:

$O_1$ is the object point, at some distance to the left of the optical system;
$E_1$ is the entrance pupil of the system;
$O^1_2$ is the location of the intermediate image formed between lens components 12 and 13;
$O^1_3$ is the virtual image formed after lens component 13;
$l_1$ is the distance of the object from the surface $r i$ and is taken as infinity;
$E^1_3$ is the exit pupil of the system, being the image of $E_1$;
$l_1$ is the distance of the entrance pupil from the surface $rl$ and is −0.70 cm.;
$l^1_{18}$ is the distance of the image from the surface $r18$ and is −2.47 cm.;
$\bar{l}^1_{18}$ is the distance of the exit pupil from the surface $r18$ and is +4.40 cm.

In the optical system described above, a real image is formed and a virtual image of this is subsequently formed with a lens of negative equivalent focal length. In this way, it has been found possible to provide an optical lens system whose equivalent focal length is small although the sum of the absolute powers of the components does not differ significantly from zero, and this makes possible the correction of image curvature. Further, a real image of the pupil $E_1$ is provided at the exit pupil, which is at an easily accessible distance from the last surface of the system. Since the lens component 13 has a negative equivalent focal length and is divergent, the real image produces a virtual image to the front of the lens component 13 which is nearer to this component 13 than the real image. Thus, the virtual image is between the real image and the front of the lens component 13.

The equivalent focal lengths of the three lens components 11, 12 and 13 are +7.31 cm., +3.28 cm., and −2.23 cm., respectively. It follows that the complete system has an equivalent focal length of +0.44 cm.

The real image is formed between the lens components 12 and 13, at a position such that the distance of this real image from the principal plane of the lens component 12 is less than its distance from the principal plane of the lens component 13.

The sum of the reciprocals of the equivalent focal lengths of the three lens components is preferably zero, or at least is numerically very small in relation to the reciprocal of the equivalent focal length of the whole system. In the example described above, the sum of the reciprocals is −0.007 cm.$^{-1}$ compared with the reciprocal for the whole system of 2.23 cm.$^{-1}$. It is because of this relationship that the image curvature is small, and this relationship is an essential requirement for a well-corrected system giving a sharp image over a plane.

It is desirable that each of the lens components 11, 12 and 13 is individually substantially free from chromatic aberration.

It is also preferable that the spherical aberration of the lens component 12, for pupil rays, is under-corrected, that is, such that pupil rays from image points near the edge of the field focus short of rays from image points nearer to the axis. This ensures that the spherical aberration of pupil rays produced by lens components 11 and 13 is compensated by that of lens component 12, leading to a final exit pupil which is substantially free from spherical aberration. This is desirable, since it avoids vignetting by the following optical systems.

The overall length of the optical axis through the system is preferably many times, at least 5 times, the equivalent focal length of the complete system.

To achieve good correction of the aberrations other than field curvature and chromatic aberration, it is desirable that lens component 11 has under-corrected spherical aberration and outward coma when used with a stop at the lens, and that lens component 13 has over-corrected spherical aberration and outward coma when it is used with a stop at the lens. In addition to the under-corrected spherical aberration of pupil rays mentioned above, the pupil rays of lens component 12 should have inward coma. This aids correction of the geometrical distortion in the system as a whole.

TABLE A (Unit used is the centimeter)

LENS COMPONENT 11

|  |  | $n_d$ | V | Diameter (D) |
|---|---|---|---|---|
| $r1=-1.172$ | $d1\text{-}2=0.25$ | 1.51899 | 60.42 | 1.1 |
| $r2=-0.696$ | $d2\text{-}3=0.05$ | Air | | |
| $r3=-1.502$ | $d3\text{-}4=0.15$ | 1.60483 | 43.83 | 1.2 |
| $r4=+4.221$ | $d4\text{-}5=0.20$ | Air | | |
| $r5=-3.014$ | $d5\text{-}6=0.45$ | 1.51899 | 60.42 | 1.7 |
| $r6=-1.163$ Air Space | $d6\text{-}7=0.827$ | Air | | |

LENS COMPONENT 12

|  |  | $n_d$ | V | Diameter (D) |
|---|---|---|---|---|
| $r7=+5.577$ | $d7\text{-}8=0.385$ | 1.64793 | 33.80 | |
| $r8=+2.018$ | $d8\text{-}9=0.963$ | 1.62253 | 60.32 | |
| $r9=-8.200$ | $d9\text{-}10=0.048$ | Air | | |
| $r10=+8.235$ | $d10\text{-}11=0.867$ | 1.62253 | 60.32 | 2.7 |
| $r11=-2.244$ | $d11\text{-}12=0.385$ | 1.64793 | 33.80 | |
| $r12=-6.478$ Air Space | $d12\text{-}13=10.512$ | Air | | |

LENS COMPONENT 13

|  |  | $n_d$ | V | Diameter (D) |
|---|---|---|---|---|
| $r13=-1.902$ | $d13\text{-}14=0.30$ | 1.58867 | 61.26 | |
| $r14=+4.192$ | $d14\text{-}15=0.20$ | 1.64793 | 33.80 | |
| $r15=-8.822$ | $d15\text{-}16=0.18$ | Air | | 1.5 |
| $r16=-1.902$ | $d16\text{-}17=0.30$ | 1.58867 | 61.26 | |
| $r17=+4.192$ | $d17\text{-}18=0.20$ | 1.64793 | 33.80 | |
| $r18=-8.822$ | | | | |

What I claim is:

1. An optical lens system in which both the entrance pupil and the exit pupil are external to the system, comprising first, second and third lens components arranged in sequence along the optical path through the lens system from object viewed to image plane, and said first and second lens components being spaced apart by a distance less than said second and third lens components are spaced apart, the first lens component having a positive equivalent focal length, the second lens component having a positive equivalent focal length, the third lens component having a negative equivalent focal length, the lens system as a whole having an equivalent focal length which is positive and numerically smaller than the equivalent focal length of each of the three lens components individually, a real image being formed between the second and third lens components, a virtual image of this real image being formed by the third lens component between the real image and the third lens component, the said first, second and third lens components in their relative spacings are together such that the distance of the said real image, formed between the second and third lens components, from the principal plane of the second lens component is less than the distance of said real image from the principal plane of the third lens component, the separation between the principal planes of the second and third lens components being at least three times as great as the separation between the principal planes of the first and second lens components, said entrance pupil being spaced from said first lens component by a distance greater than one half said equivalent focal length of the lens system.

2. An optical lens system in which both the entrance pupil and the exit pupil are external to the system, comprising first, second and third lens components arranged in sequence along the optical path through the lens system from object viewed to image plane, at least one of said first, second and third lens components comprises a compound lens, and said first and second lens components being spaced apart by a distance less than said second and third lens components are spaced apart, the first lens component having a positive equivalent focal length, the second lens component having a positive equivalent focal length, the third lens component having a negative equivalent focal length, the lens system as a whole having an equivalent focal length, which is positive and numerically smaller than the equivalent focal length of each of the three lens components individually, the sum of the reciprocals of the equivalent focal lengths of said first, second and third lens components being numerically very small in relation to the reciprocal of the equivalent focal length of said lens system, the equivalent focal length of the first lens component being numerically greater than that of the second lens component and the equivalent focal length of the second lens component being numerically greater than that of the third lens component, the ratio of the separation between the principal planes of the second and third lens components and the separation between the principal planes of the first and second lens components exceeds the value of three:one (3:1), a real image being formed between the second and third lens components, a virtual image of this real image being formed by the third lens component between the second and third lens components, the said first, second and third lens components in their relative spacings are together such that the distance of the said real image, formed between the second and third lens components, from the principal plane of the second lens component is less than the distance of said real image from the principal plane of the third lens component, said entrance pupil being spaced from said first lens component by a distance greater than one half said equivalent focal length of the lens system.

3. An optical lens system as claimed in claim 2 in which the sum of the reciprocals of the equivalent focal lengths of said first, second and third lens components is substantially zero.

References Cited by the Examiner

UNITED STATES PATENTS

| 2,003,881 | 6/1935 | Grosset et al. | 88—57 |
| 2,076,190 | 4/1937 | Wood | 88—57 |
| 3,039,360 | 6/1962 | Hopkins | 88—57 |
| 3,170,984 | 2/1965 | Rosenberger et al. | 88—57 |

JEWELL H. PEDERSEN, *Primary Examiner.*

J. K. CORBIN, *Examiner.*